Sept. 18, 1951      J. CASABIANCA      2,568,430
AUTOMOBILE HUBCAP COVER
Filed March 9, 1948      2 Sheets-Sheet 1
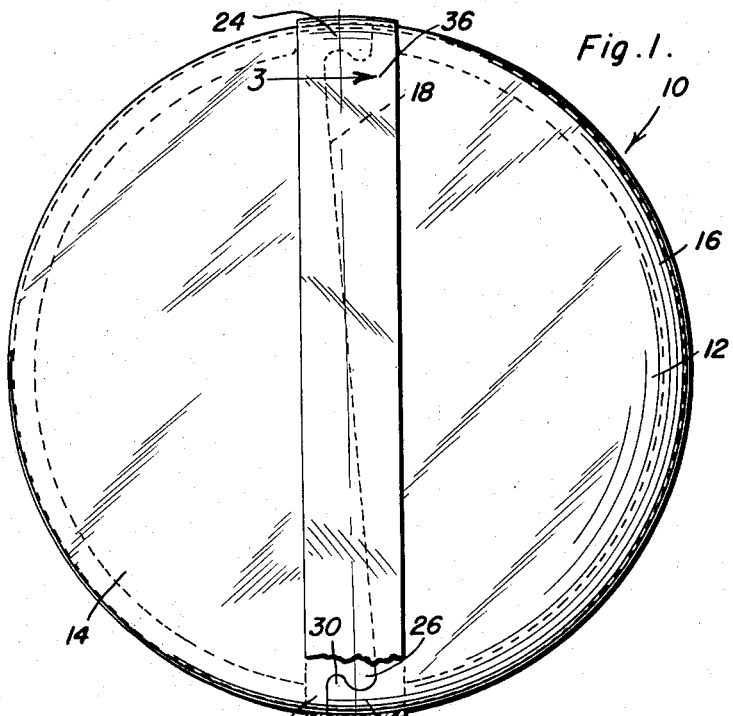
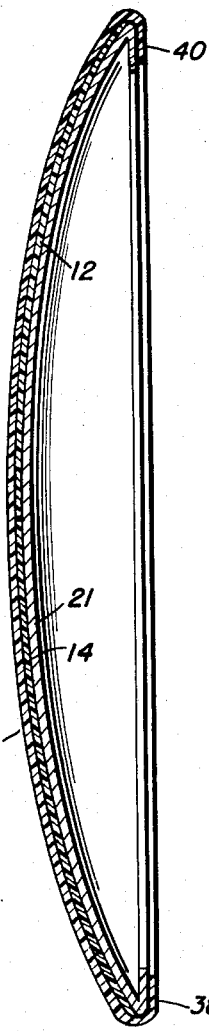
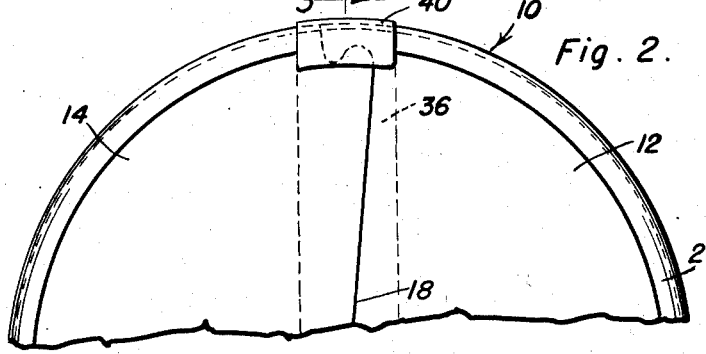
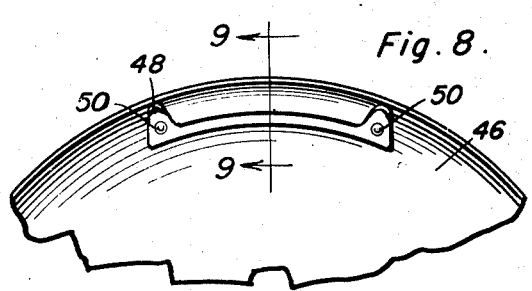
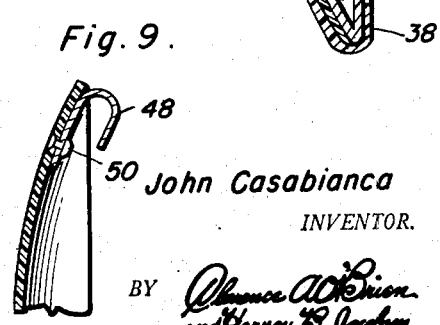
John Casabianca
INVENTOR.

Sept. 18, 1951 J. CASABIANCA 2,568,430
AUTOMOBILE HUBCAP COVER
Filed March 9, 1948 2 Sheets-Sheet 2
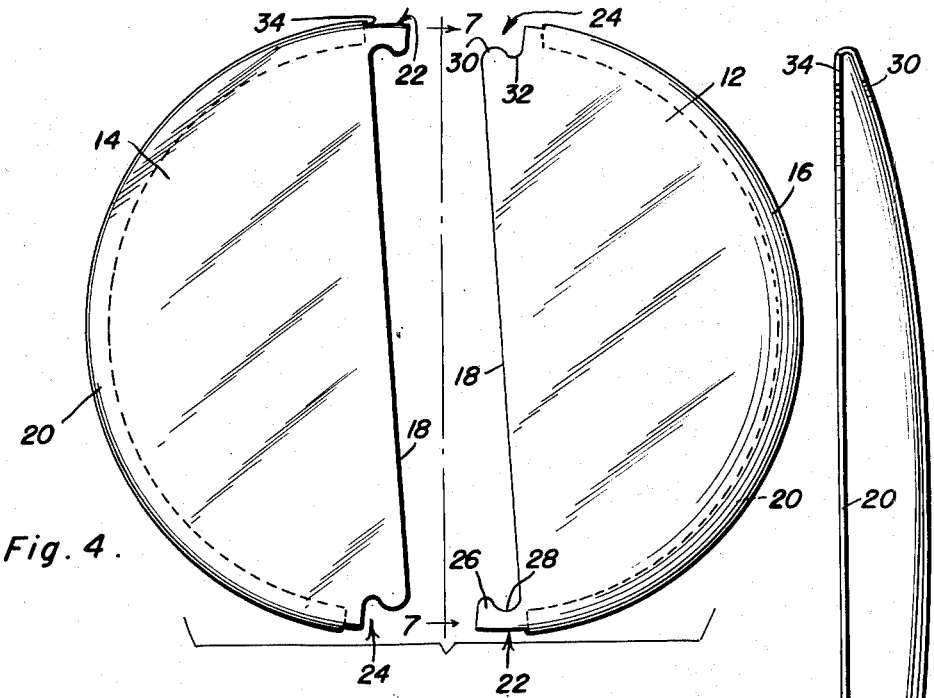
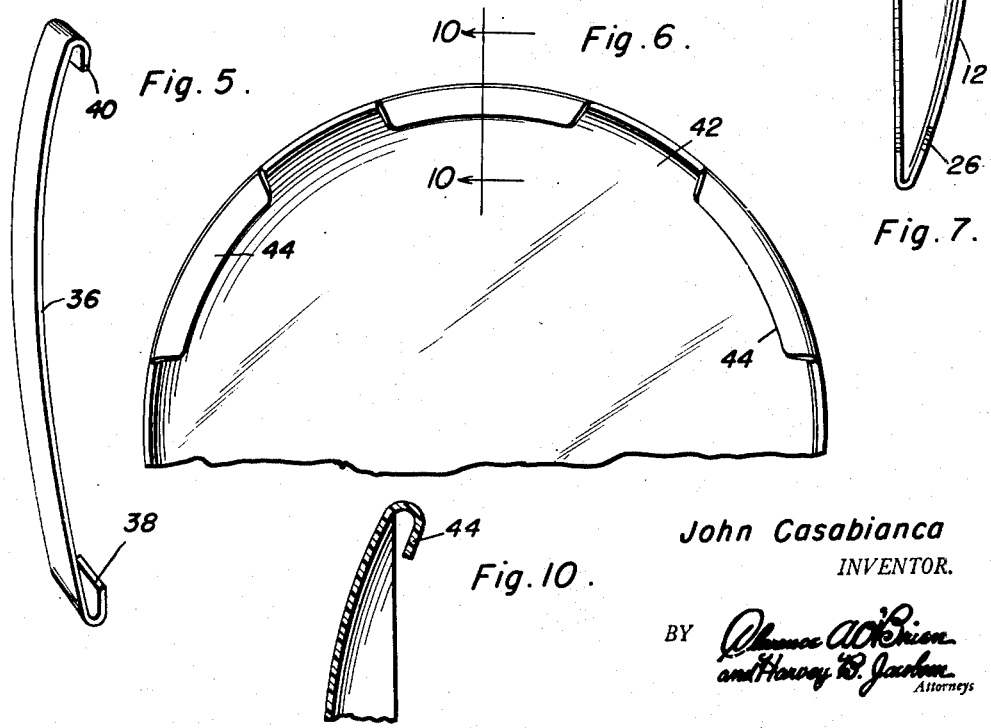
John Casabianca
INVENTOR.

UNITED STATES PATENT OFFICE 2,568,430

AUTOMOBILE HUBCAP COVER

John Casabianca, New York, N. Y., assignor of one-half to John Fisher, New York, N. Y.

Application March 9, 1948, Serial No. 13,757

6 Claims. (Cl. 301—108)

This invention relates to a device adapted for attachment to a hub cap of a wheel of an automobile or similar vehicle and has for its primary object to protect the metallic plate or hub cap disk from damage occasioned by the travel of the automobile or vehicle through mud or ice and over rough and unpaved roads, where stones, asphalt or the like are likely to fly up and strike the wheel and injure the hub cap by denting, scratching or the like.

Another object of this invention is to provide a plastic cover for a hub cap that is easily and conveniently snapped into covering placement on a hub cap and is retained in secured position thereon, regardless of any jarring or bouncing, so that any damage to the hub cap is obviated.

Another object of this invention is to provide a plastic cover for a hub cap that is designed to fit any type of plate or disk provided by the various makes or models of vehicles and which may be suitably colored to blend with the color scheme and enhance the beauty thereof.

Another object of this invention is to provide a cover for a hub cap, formed of any suitable thermoplastic material, which is simple and inexpensive to manufacture, easily attached on a hub cap and, which is reliable and durable in use.

A meritorius feature of this invention resides in the provision of a plastic cover, adapted to be positioned over a hub cap in protective placement thereon, and which is provided with suitable peripheral attaching elements to securely lock the body portion thereof on the hub cap.

These and ancillary objects and other important features are attained by this invention, a preferred embodiment of which is set forth in the following description and illustrated in the accompanying drawings, wherein:

Figure 1 is a top plan view of one embodiment of this invention, illustrating a sectional cover member provided with locking and attaching means;

Figure 2 is a fragmentary view of a back portion of the sectional cover member;

Figure 3 is a vertical sectional view, taken substantially on the line 3—3 of Figure 1;

Figure 4 is an enlarged structural view, illustrating the semi-circular sections in unattached positioning;

Figure 5 is a view in perspective of the clamping and attaching means provided to secure the locked sections on the hub cap;

Figure 6 is a fragmentary bottom plan view of another embodiment of this invention, exemplifying a unitary plastic cover plate, provided with integral peripheral attaching clips;

Figure 7 is an enlarged side elevational view taken in the direction of arrows 7—7 in Figure 4 to show one of the cover-member sections;

Figure 8 is a fragmentary detailed view of another embodiment of this invention, showing attaching clip elements riveted or otherwise secured to a unitary cover member;

Figure 9 is a sectional view taken substantially on the lines 9—9 of Figure 8, and Figure 10 is a vertical sectional view taken substantially on the plane of lines 10—10 of Figure 6.

Referring now more particularly to the drawings, wherein similar characters of reference designate corresponding parts throughout, there is shown a cover member 10, which is unitarily molded of any suitable thermal setting or thermoplastic material, such as Bakelite, Plexiglas or the like, and which comprises a pair of complementary semi-circular sections 12 and 14. The cooperating semi-circular sections 12 and 14 are formed with an arcuate edge 16 and a substantially straight edge 18, the substantially straight edge 18 being disposed at an angle oblique to the terminating portions of the arcuate edge 16.

Integrally disposed on the periphery of the arcuate edge 16 is a bead or overlapping portion 20, which is inturned on the back surface of the sections and is adapted to engage the circumference of a hub cap 21 (see Figure 3). Suitably formed on the opposite extremities of the straight edge 18 are cooperating locking joints 22 and 24, respectively. The locking joint 22 is suitably offset from the plane of the straight edge 18 in continuous integral placement with the arcuate edge 16 and comprises a terminating vertically raised or protruding tongue 26, defining a re-entrant groove 28, which is positioned between the raised tongue 26 and the juncture of the straight edge 18. The locking joint 24 is formed in complementary placement to the locking joint 22 and comprises a tongue 30, which is more spread and not as raised as the tongue 26 and is adapted to engage the re-entrant groove 28 of the joint 22, with a groove 32 disposed between the tongue 30 and the body portion 12 or 14 of the semi-circular disk and adapted to receive and seat the protruding tongue 26, as shown more clearly in Figures 1 and 4 of the drawings.

It is to be noted that the overlapping or bead portions 20, disposed on the arcuate edge of the semi-circular plates, extend to portions spaced from the straight edge 18 and from the offset locking grooves 22 and 24, thereby defining a pair of diametrically opposed peripheral channels 34, which are adapted to seat an elongated arcuate strap 36, and to restrain the strap 36 against lateral displacement, in its overlying engagement diametrically with the surface of the cooperating straight edges 18—18 of the semi-circular sections. The elongated strap 36 has a pair of inturned flanges or clips 38 and 40 on the opposite extremities thereof, which are adapted to engage and clip over the circumferential periphery of a hub cap 21, as shown in Figure 3 of the drawings, With reference to Figure 3 of the drawings, it can be seen that the strap 36, overlies the plate or disk 38 of a hub cap 21, with the integral clip ends 38 and 40 of the strap suitably clamped into engagement and thereby serving as a retaining element or locking member, for the sectional cover 10.

Referring now to Figures 6 and 10 of the drawings, there is shown a unitary plastic cover member 42, which is unitarily molded from a suitable plastic material, such as a thermoplastic or thermal setting material, and which is formed of any suitable size, being circular and suitably disk-shaped to engage and overlie the outer surface of a hub cap. Suitable means are provided to retain the cover plate in secure placement on the hub cap and comprises a series of integral circumferentially spaced clips 44, which extend from the circumferential periphery of the body portion 42 and are suitably inturned rearwardly to securely embrace the hub cap, as shown in Figure 10 of the drawings.

Referring now to Figures 8 and 9 of the drawings, there is shown another embodiment of this invention, which comprises a unitary body member 46, similar to the body portion 42 of Figure 6, with plastic clips 48 suitably riveted as at 50 to the back portion of the plate 46, adjacent the circumferential periphery thereof, with the U-shaped or hook clips 48 adapted to embrace the hub cap and securely retain the cover member 46 thereon.

Of course, it is to be understood that the above noted cover members may be molded or afterwards provided with suitable colors, to match or blend in with the color of the motor vehicle and, also, may be made of suitable thicknesses and diameters, to accommodate various makes and models of cars and to be used for varying purposes.

Thus, it is to be understood that certain changes may be effected, not amounting to invention, and coming within the spirit of the invention and the scope of the appended claims.

Having described the invention what is claimed as new is:

1. A cover member for attachment to a hub cap comprising a pair of complementary semi-circular arcuately raised disks, each including an arcuate edge and an oppositely disposed substantially straight edge, an inwardly directed flange on the periphery of the arcuate edge for engaging the circumference of a hub cap, oppositely disposed locking joints on the straight edges, and an attaching member overlying said locking joints and embracing the disks.

2. The combination of claim 1, wherein said attaching member includes an elongated arcuate strap having oppositely disposed inturned flanges on the extremities thereof.

3. The combination of claim 1, wherein channels are formed on the disks for accommodating said attaching member.

4. A cover member for attachment to a hub cap comprising an arcuately raised sectional body including a pair of interlocking sections each having an arcuate edge and an oppositely disposed substantially straight edge, a circumferential bead on said arcuate edge for overlapping the circumferential periphery of a hub cap, a locking joint on said straight edges including oppositely disposed offset portions defining a re-entrant groove and a locking tongue, a pair of diametrically opposed peripheral channels formed on said body along the juncture of the sections, an elongated strap seated in said channels, and inturned flanges on the extremities of said strap for clamping the body on a hub cap.

5. A cover for a hub cap including a pair of rigid semi-circular complementary sections having abutting straight edges, interlocking means carried by said edges, and means for retaining the sections on a hub cap, said last named means including a pair of diametrically opposed peripheral channels formed on the straight edges of the section and an elongated arcuate strap seated in said channels and having opposed inturned clamping extremities.

6. A cover for a hub cap including a pair of rigid semi-circular complementary sections having abutting straight edges, interlocking means carried by said edges and means for retaining the sections on a hub cap, said interlocking means including a tongue and groove locking arrangement.

JOHN CASABIANCA.

REFERENCES CITED

The following references are of record in the file of this patent:

UNITED STATES PATENTS

| Number | Name | Date |
| --- | --- | --- |
| 258,492 | Squires | May 23, 1882 |
| 1,127,432 | Green | Feb. 9, 1915 |
| 1,426,191 | Hitch | Aug. 15, 1922 |
| 1,936,725 | Miller | Nov. 28, 1933 |
| 2,002,872 | Sinclair | May 28, 1935 |

FOREIGN PATENTS

| Number | Country | Date |
| --- | --- | --- |
| 469,632 | Great Britain | July 29, 1937 |